(12) United States Patent
Beaumont et al.

(10) Patent No.: US 6,959,333 B2
(45) Date of Patent: Oct. 25, 2005

(54) TECHNIQUE FOR CONTENT DELIVERY OVER THE INTERNET

(75) Inventors: Leland R. Beaumont, Middletown, NJ (US); Markus Hofmann, Fair Haven, NJ (US); Michael Vernick, Ocean, NJ (US); Steve Y Wang, West Windsor, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 781 days.

(21) Appl. No.: 09/851,267

(22) Filed: May 8, 2001

(65) Prior Publication Data

US 2002/0169890 A1 Nov. 14, 2002

(51) Int. Cl.[7] ............................................. G06F 15/177
(52) U.S. Cl. ...................... 709/223; 709/238; 709/226; 370/255
(58) Field of Search ................................ 709/223, 226, 709/238; 370/255

(56) References Cited

U.S. PATENT DOCUMENTS

| | | | | |
|---|---|---|---|---|
| 6,112,239 A | * | 8/2000 | Kenner et al. | 709/224 |
| 6,175,869 B1 | * | 1/2001 | Ahuja et al. | 709/226 |
| 6,178,160 B1 | * | 1/2001 | Bolton et al. | 370/255 |
| 6,223,209 B1 | * | 4/2001 | Watson | 709/201 |
| 6,249,801 B1 | * | 6/2001 | Zisapel et al. | 718/105 |
| 6,425,003 B1 | * | 7/2002 | Herzog et al. | 709/223 |
| 6,629,127 B1 | * | 9/2003 | Deen et al. | 709/203 |
| 6,694,358 B1 | * | 2/2004 | Swildens et al. | 709/218 |
| 6,810,411 B1 | * | 10/2004 | Coughlin et al. | 709/203 |
| 2002/0038360 A1 | * | 3/2002 | Andrews et al. | 709/223 |

* cited by examiner

*Primary Examiner*—Viet D. Vu
*Assistant Examiner*—Jinsong Hu

(57) ABSTRACT

A content delivery system for a content provider that comprises at least two content delivery servers for delivering contents, a preference database for storing an estimated distance between each of the at least two content delivery servers and a client, and a content provider domain name server for mapping the name of the content provider to the at least two content delivery servers and selecting one of the content delivery servers to deliver the content, that has a shortest estimated distance to the client in the preference database.

13 Claims, 6 Drawing Sheets

| | C1 | C2 | C3 | C4 (optional) | C5 (optional) | C6 (optional) |
|---|---|---|---|---|---|---|
| | Delivery Server Address | Destination Domain | Estimated Distance (milliseconds) | number of times being selected per hour | Health | Time-To-Live (minutes) |
| R1 | | | | | | |
| R2 | 152.192.16.15 | 182.192 | 100 | 100 | Working | 1 |
| R3 | 153.192.16.15 | 182.192 | 90 | 90 | Down | 2 |
| R4 | 154.192.16.15 | 182.192 | 10 | 10 | Working | 9 |
| R5 | 155.192.17.15 | 155.192 | 20 | 20 | Working | 8 |
| R6 | 156.192.17.15 | 156.192 | | | Working | 1 |
| R7 | 157.192.17.15 | 156.192 | 50 | 50 | Working | 5 |
| R8 | 158.192.17.15 | 156.192 | 70 | 70 | Working | 3 |

FIG. 2

| Delivery Server Address | Destination Domain | Preference | Number of lost packets | Number of connections | Estimated distance (optional) | number of times being selected per hour (optional) | Health (optional) | Time-To-Live (minutes) (optional) |
|---|---|---|---|---|---|---|---|---|
| 152.192.16.15 | 182.192 | 1 | 100 | 1 | 100 | 100 | Working | 1 |
| 153.192.16.15 | 182.192 | 2 | 200 | 2 | 90 | 90 | Down | 2 |
| 154.192.16.15 | 182.192 | 9 | 900 | 9 | 10 | 10 | Working | 9 |
| 155.192.17.15 | 155.192 | 8 | 800 | 8 | 20 | 20 | Working | 8 |
| 156.192.17.15 | 156.192 | 1 | 100 | 1 | 10 | 10 | Working | 1 |
| 157.192.17.15 | 156.192 | 5 | 500 | 5 | 50 | 50 | Working | 5 |
| 158.192.17.15 | 156.192 | 3 | 300 | 3 | 70 | 70 | Working | 3 |

TECHNIQUE FOR CONTENT DELIVERY OVER THE INTERNET

FIELD OF THE INVENTION

The present invention relates to data communication and, more particularly, to content delivery over the Internet.

BACKGROUND OF THE INVENTION

The Internet has become a significant way of obtaining information around the world. (As used herein, information is also referred to as "content.") A computer connected to the Internet is called a host. Each host is identified by a name which comprises labels separated by "." such as "www.foo.com."

The name identifying a host corresponds to one or more 32-bit Internet Protocol (IP) addresses. A domain name, on the other hand, corresponds to a prefix of an IP address, that is shared by all its subdomains and hosts in that domain. An IP address (hereinafter "address") is usually written in 4 numeric fields separated by "." such as 152.192.16.15, where each field represents a decimal number ranging from 0 to 255 and occupying 8 bits when converted into a binary number. The model of interaction between two hosts generally is the client-server model in which a client host ("hereinafter "client") sends a request to a server host (hereinafter "server") and the server returns a response to the client using the above-mentioned IP addresses.

Generally, when a user of a client requests content from a content provider, the user usually uses the name of the content provider, which may correspond to one or more addresses identifying one or more content delivery servers of that content provider. In order to connect to a content delivery server, the client generally sends a request (query) to a special server to map the name into an address. This special server is called a domain name server (DNS). The DNS generally selects an address mapped to that name randomly or in a round robin manner. Upon receiving the address from the DNS, the client uses the selected mapped address to then connect to the content delivery server identified by the selected mapped address. In the following, "mapped address" is used interchangeably with "mapped delivery server" identified by the "mapped address."

SUMMARY OF THE INVENTION

A problem with the above selecting scheme is that the best content delivery server might not be selected causing unnecessary delivery delay. The problem is addressed by having a domain name server (DNS) receive a name from a requesting client (requester) and select one of the addresses mapped to the name, that is best to the requester.

An embodiment is a DNS that comprises a mapping database for storing a map between a name and an address in which at least one name is mapped to more than one address, a map retriever for retrieving all addresses mapped to the input name in the mapping database, a preference database for storing a preference number associated with an address and a requester identifier, and a selector for retrieving a preference number associated with each retrieved mapped address and the requester identifier and selecting one of the retrieved mapped addresses that has the highest preference number.

Another embodiment is a content delivery system for a content provider that comprises three content delivery servers for delivering content, a preference database for storing estimated distance between each of the three content delivery servers and a client, and a content provider DNS for mapping the name of the content provider to the addresses identifying the three content delivery servers and selecting an address identifying one of the three content delivery servers to deliver the content that has a shortest estimated distance to the client in the preference database.

According to a feature of the invention, the content provider DNS dynamically assigns a time-to-live (TTL) value to each content delivery server associated with a client. The TTL assigned to a content delivery server associated with a client is a function of the estimated distance from the content delivery server to the client. Preferably the assigned TTL is inversely related to the estimated distance. Generally the larger the TTL value, the longer the client can use the selected content delivery server without having to request a new mapping.

BRIEF DESCRIPTION OF THE DRAWINGS

The present invention will be more fully appreciated from a consideration of the following Detailed Description, which should be read in light of the accompanying drawings in which:

FIG. 2 shows an illustrative preference table in accordance with the principles of the invention;

FIG. 3 shows an illustrative preference table comprising preference numbers and TTL values in accordance with the principles of the invention;

DETAILED DESCRIPTION

The method and steps described herein can be implemented using conventional computer programming techniques which are not discussed herein.

Figure 1:
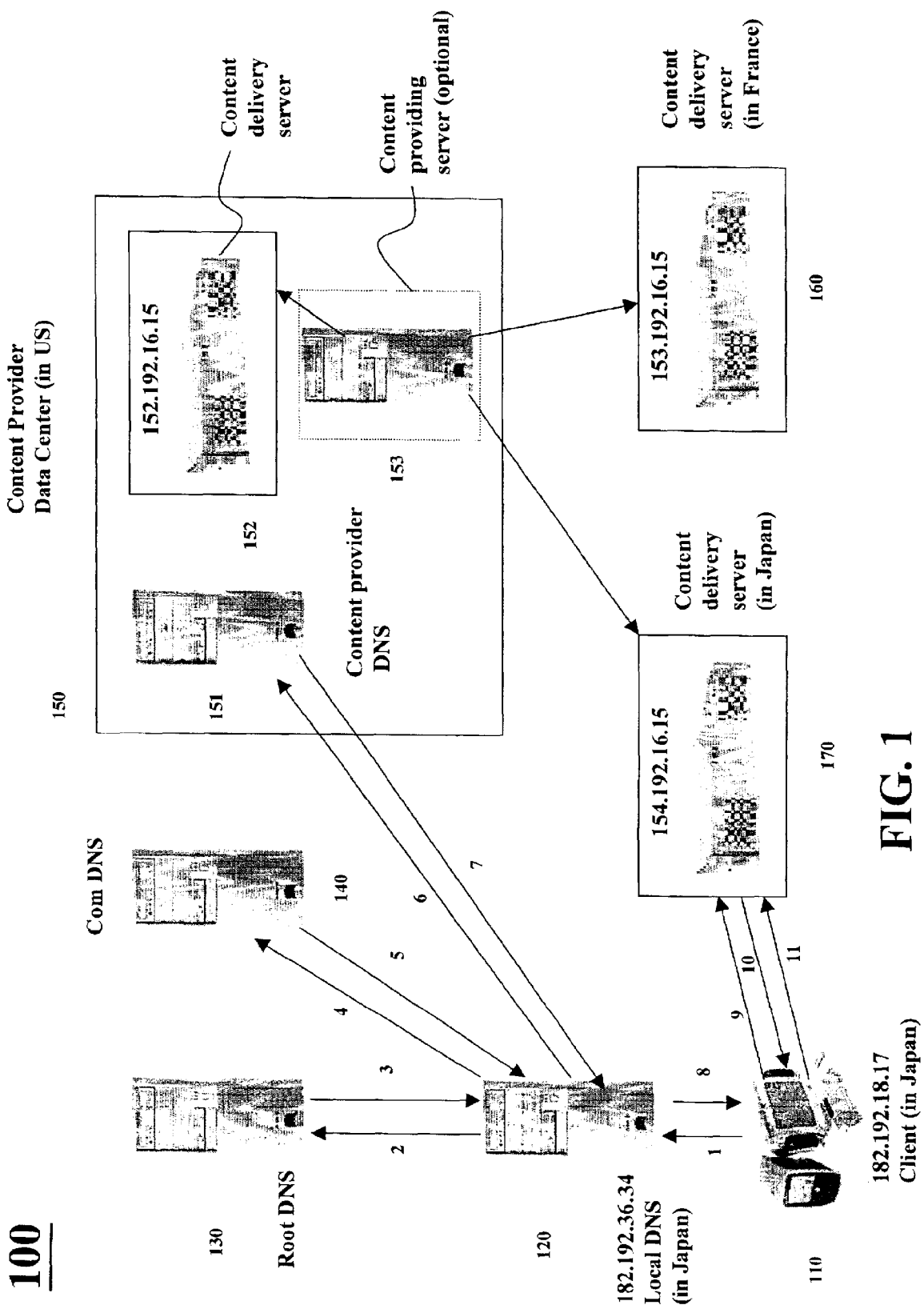
FIG. 1 shows an exemplary content delivery system in accordance with the principles of the invention.

An exemplary content delivery system in accordance with the principles of the invention is shown in FIG. 1. Other than the inventive concepts, the equipment and network used in FIG. 1 are known in the art and not discussed herein. Furthermore, the method and steps described herein can be implemented using conventional computer programming techniques, which are not discussed herein. System 100 of FIG. 1 illustratively shows a portion of a data network. It is assumed that the content provider is identified by the name, "www.foo.com." (It should be noted that the name of a content provider does not have to reflect the kinds of content it provides.) System 100 comprises client 110 identified by address 182.192.18.17, local domain name server (DNS) 120 identified by address 182.192.36.34, root DNS 130, Com DNS 140, content provider data center 150, and content delivery servers 160 identified by address 153.192.16.15 and 170 identified by address 154.192.18.17. Content provider data center 150 comprises content provider DNS 151, content delivery server 152 identified by address 152.192.16.15, and optionally content providing server 153. For illustrative purposes, client 110, local DNS 120, and content delivery server 170 are located in Japan, content provider data center 150 is located in the United States of America (US), and content delivery server 160 is located in France.

When a user of client 110 requests content provided by content provider, "www.foo.com," client 110 first seeks to obtain a mapped address of the content provider. The sequence for obtaining the mapped address is described below and is shown in FIG. 1. Client 110 requests (queries) local DNS 120 to find a mapped address of "www.foo.com" (step 1). It is assumed that local DNS 120 does not have the data. Local DNS 120 sends a mapping request (query) to Root DNS 130 which is the DNS at the root domain of the Internet (step 2). (It should be noted that a mapping request is contained in an Internet Protocol (IP) packet (datagram) and each IP packet contains source and destination addresses as known in the art.) Root DNS 130 responds (answers) and refers local DNS 120 to Corn DNS 140 which is a DNS serving the "com" domain in the US (step 3). After receiving the referral, local DNS 120 sends a mapping request to Com DNS 140 (step 4). Corn DNS 140 responds and refers local DNS 120 to content provider DNS 151 which is the local DNS for domain "foo.com" (step 5). Local DNS 120 then sends a mapping request to content provider DNS 151 (step 6).

Upon receiving the mapping request and in accordance with the principles of the invention, content provider DNS 151 maps the name "www.foo.com" to the addresses identifying the three content delivery servers 152, 160, and 170, and selects content delivery server 170 because content delivery server 170 has the shortest estimated distance or is closest to client 110 (described below). It should be noted that in order for content delivery server 170 to be selected, there must be an indication showing that content delivery server 170 is in-service (working). Content delivery servers that are out of service (down) are not selected even if they are closer to the client. In accordance with the principles of the invention, content provider DNS 151 dynamically assigns a TTL value (for example 9 minutes) to content delivery server 170 as a function of the estimated distance from content delivery server 170 to client 110. Content provider DNS 151 returns a response comprising the address of content delivery server 170 and the TTL value to local DNS 120 (step 7), which sends a response comprising the same to client 110 (step 8). As known in the art, and other than the inventive concept, a TTL value indicates to a receiver how long the receiver can use the mapped address without having to request a new mapping.

Client 110 then starts a three-way handshake as known in the art to connect to content delivery server 170. First, client 110 sends a request for connection (a TCP message with the SYN bit set) to content delivery server 170 using the received mapped address which identifies content delivery server 170 (step 9). Second, content delivery server 170 grants the request by sending a TCP message with both the SYN and the ACK bits set (step 10) and, finally, client 110 acknowledges the receipt of the grant by sending a TCP message with the ACK bit set (sequence number 11). At this point, the connection between client 110 and content delivery server 170 is established. It should be noted that the sequence described is for illustration purposes only. Several steps may be omitted. For example, if local DNS 120 has cached the referred DNS information, local DNS 120 may directly request the mapping information from content provider DNS 151. In the extreme case, client 110 may cache the mapping information and continue to use the mapped address without having to request a new mapping if the cached mapping data is still within the interval specified by the TTL value previously received.

In accordance with the principles of the invention, the content provider "www.foo.com" optionally also includes content providing server 153. In this arrangement, content delivery servers 152, 160, and 170 cache the content received from content providing server 153 and ask for an update of a content if the content requested by a client is out of date or does not exist in their caches. Caching techniques are known in the art and not described herein.

As noted above, content provider DNS 151 maps the name "www.foo.com" against a mapping database and retrieves the addresses identifying the three content delivery servers. The mapping database generally comprises a table and each entry of the mapping database table maps a name to an address and at least one name is mapped to more than one address. It should be noted that other content providers (not shown) could share the same three content delivery servers used by "www.foo.com" to save cost.

After content provider DNS 151 has retrieved all content delivery servers mapped to content provider, "www.foo.com," content provider DNS 151 selects one of those working mapped addresses (mapped content delivery servers) to deliver the content. A mapped address that is not in working state is not selected. (The mechanism for determining the health state of a content delivery server is described below.) In accordance with the principles of the invention, content provider DNS 151 retrieves from a preference database the estimated distance data associated with each working content delivery server and client 110. The preference database comprises an illustrative table shown in FIG. 2. The preference database table illustratively contains the addresses of content delivery servers, the destination domains, and the estimated distances to destination domains in columns C1, C2, and C3, respectively. A destination domain is used to identify a requesting client (requester) and, thus, its location. As mentioned previously, a domain is identified either by a name or a prefix of an IP address that is shared by all its subdomains and hosts in that domain. Generally, a local DNS in a domain is assigned to serve all hosts in that domain. For example, in FIG. 1, local DNS 120 and client 110 are in the same domain identified by the prefix 182.192. It is assumed that the estimated distance from a given content delivery server to any client in a domain is about the same and an estimated distance obtained for one client with respect to a given content delivery server can be used for all clients in that domain. When a content provider DNS receives a mapping request from the local DNS, the content provider DNS retrieves the domain information of the local DNS from the request, uses the retrieved domain as the destination domain in the preference database table to retrieve the estimated distance from each mapped content delivery server to that destination domain, and uses the retrieved estimated distance data to select a working content delivery server for the requesting client. For example, the content provider DNS selects the working content delivery server with the shortest estimated distance to the requesting client. Even if a client is not in the same domain as the serving local DNS, the estimated distance used by other clients in the same domain with the local DNS should be a good estimate for this client because, generally, a client is assigned to a nearby local DNS. Thus, in the example, the domain of a local DNS is used to identify all clients it serves. Advantageously, the size of the preference database table is significantly reduced because only the domain identifications and no individual host addresses or names have to be in the table. Although presented as a table, other data structures such as a tree can be used as well. Those skilled in the art would appreciate that the address prefix used in the illustrative preference table does not have to identify a domain. As long as the address prefix is shared by a local DNS and most of the clients it serves, the address prefix can be used to identify all clients served by the local DNS. Those skilled in the art would also appreciate that instead of using the complete address of a content delivery server in the table, the address prefixes of the content delivery server can be used to reduce the table size. Furthermore, those skilled in the art would realize that more than one preference database can be used, for example, one as a working copy and the other as a backup copy.

Another embodiment of selecting a closest content delivery server for a client is to use the Internet Protocol (IP) address space mapping. As known in the art, the IP address space mapping maps an address block to a geographical area. More than one address block may be mapped to a geographical area. A content provider DNS uses the IP address of a client, finds the corresponding geographical area according to the IP address space mapping, and selects a content delivery server in the same geographical area. Preferably, the selected content delivery server shares the same address block.

Other client identifiers can be used to identify a client. For example, a mapping request from a local DNS can comprise the address or the name of a requesting client (requester), so that its address or name can be used as its identifier in the preference database table. In this case, the standard mapping request in the TCP/IP must be modified to include the address or the name of a requesting client.

As described above that a content provider DNS must select a working content delivery server. The health status of each content delivery server is illustratively saved in a preference table such as in C4 column in FIG. 2. When a mapped address (which identifies a content delivery server) is selected, the content provider DNS also checks the associated health status in the preference table to determine if the selected mapped address is a working one. If not, the next closest mapped address is selected and its health status checked. This process continues until a working mapped address is selected. A person skilled in the art would readily realize that a content delivery server may check the health status of a mapped address before selecting that mapped address, so that the mapped address selected is always a working one. In the preferred embodiment, a content provider DNS inquires the health of a content delivery server by sending a message to that content delivery server. If the response from that content delivery server indicates that it is working, the content provider DNS stores the health status of "Working" in the health field of the associated entry in the preference table. In all other cases, including no response from that inquired content delivery server, the content provider DNS stores the health status of "Down" in the health field of the associated entry. It should be noted that the health status field does not have to be in the preference table. For example, a content provider DNS may inquire the health status of a mapped address during the selection process and before the mapped address has been selected. This way, the health status is not saved.

In accordance with the principles of the invention, each content delivery server measures the round trip time (RTT) during a three-way handshake with a client and reports the measured RTT as the estimated distance to the domain that the client is in, so that the content provider DNS can update the estimated distance data in the corresponding entry in the preference database table. The RTT is the time elapsed between the time a content delivery server sends out the message with both the SYN and the ACK bits set in response to a connection request from a client and the time the content delivery server receives the response message with the ACK bit set from the client. Conceptually, the measured RTT approximates the distance between the content delivery server and the client. Thus, the measured RTT is used as the estimated distance between a content delivery server and a client. A content delivery server reports a measured RTT to the content provider DNS using the Simple Network Management Protocol (SNMP) (not shown). The SNMP is known in the art and not discussed herein. Other ways of obtaining an estimated RTT can be used. For example, one can use the distance data from routing tables. Similarly, other reporting mechanisms can be used. For example, one can just use a TCP or UDP message to report a RTT.

This paragraph describes in more detail the above-mentioned selection criteria under different circumstances. When no estimated distance data for all content delivery servers to a destination domain are available, a content provider DNS selects the first mapped content delivery server in the preference database table. For example, the content delivery servers identified in column C1 of rows R2, R3, and R4 in FIG. 2 are mapped to the same destination domain, 182.192, at column C2. Assuming no estimated distance data are available in those three rows, a content provider selects the content delivery server identified by 152.192.16.15 in row R2 if the mapping request is from a local DNS from that domain. When some but not all content delivery servers have the estimated distance data to a client, the content provider DNS selects one of those content delivery servers, that does not has the estimated distance data in the table. For example, the three content delivery servers identified in column C1 of rows R6, R7, and R8, are mapped to the same destination domain, 156.192, but the one in row R6 does not have the estimated data and, thus, is selected if there is a mapping request from a local DNS from that domain. (Other alternative selection criteria when some of the content delivery servers do not have the estimated distance data in the table are described in the next paragraph.) When all content delivery servers have the estimated distance data, the content provider DNS selects the content delivery server with the shortest estimated distance to the destination domain that the requesting local DNS is in. For example, the content delivery server in row R4 identified by address 154.192.16.15 is selected because it has a shortest estimated distance of 10 milliseconds to the destination domain identified by 182.192 if the requesting local DNS is from that destination domain. As noted above, the selected content delivery server must be working by checking, for example, the health status field in column C4 of the preference table.

This paragraph describes alternative selection criteria when some of the content delivery servers do not have the estimated distance data in the table. In the first alternative selection criterion, if the estimated distance of the working mapped address that has the shortest estimate distance to the client is shorter than a pre-defined threshold (15 milliseconds as an example), that content delivery server is repetitively selected for that client. Otherwise, if the closest working content delivery server has estimated distance not shorter than the pre-defined threshold, one of the working mapped addresses that do not have the estimated distance data is selected. In the second alternative selection criterion, if the same working content delivery server has been selected for a pre-defined number of times (for example, 10 times) within a given period (for example, one hour), one of the working mapped addresses that do not have the estimated distance data is selected. The number of times a content delivery server has been selected is illustratively stored in a preference table such as in column C5 of the preference table shown in FIG. 2. The value of the number of times a working mapped address is reset to zero illustratively every hour and is incremented every time the working mapped address is selected.

As mentioned previously, in response to a mapping request, a content provider DNS returns a message comprising the mapped address identifying a content delivery server and a TTL value. In accordance with the principles of the invention, a TTL value associated with a content delivery server and a client is dynamically assigned. Preferably, a content provider DNS assigns a TTL to a content delivery server associated with a client as a function of the associated estimated distance. For example, a content provider DNS assigns a TTL value for a content delivery server associated with a client, which is inversely related to the estimated distance from the content delivery server to the client. For example, in FIG. 2, the content delivery server in row R4 identified by address 154.192.16.15 is assigned the largest TTL value because the content delivery server has the shortest estimated distance to the destination domain, 182.192. Other assigning rules can be employed as well such as assigning a TTL value as a function of the load of a content delivery server or the number of times that a content delivery server is selected in a given time period. For example, assign a TTL value that is inversely related to the load of a content delivery server, so that a client can continue to use a lighter loaded content delivery server longer. Another example is to assign a TTL value that is directly related to the number of times a content delivery server is selected during a given time period, so that the number of mapping requests may be reduced for a frequently selected content delivery server. A TTL value is assigned and updated each time a connection is made between the content delivery server and a client. In the preferred embodiment, the TTL values are not saved in the preference database table. Other assigning schedules can be used as well. For example, a content provider DNS can assign and update a TTL value periodically or when an estimated distance is updated. In this case, the TTL values should be saved, for example, in the illustrative preference data base table as shown in FIG. 2.

Although as illustrated above, the rule for selecting the best content delivery server in accordance with the principles of the invention is the shortest estimated distance to the client, other rules such as selecting one based on user preferences can be used as well. For example, a preference number can be assigned to each content delivery server and a destination domain, and the content delivery server with the highest retrieved preference number is selected. FIG. 3 shows an illustrative example of incorporating preference numbers in a column, column 373, of the illustrative preference database table. A preference number as illustrated is entered manually. However, other methods can be used as well. For example, the estimated distance data discussed previously can be viewed as preference numbers and are automatically entered and updated. A second alternative selection rule is selecting the one with the smallest number of lost packets (for example, 100 packets) in a given period (for example, one hour). The number of lost packets for each content delivery server is illustratively saved in a preference table such column 374 in the preference table in FIG. 3. Each content delivery server collects the number of packets as known in the art and reports the number to the associated content provider DNS periodically (for example every hour), so that the content provider DNS can update the value of the corresponding entry. A third alternative selection rule is selecting the one with the smallest number of connections. As known in the art, a content delivery server can be connected to several clients in a given time. The number of connections for each content delivery server is illustratively saved in a preference table such as in column 375 of the preference table in FIG. 3. The associated content provider DNS inquires the number of connections periodically (for example, every 10 minutes) and saves the number in the corresponding entry in the preference table. The content provider DNS may also inquire the number of connections for each working mapped address during the selection process and thus the number of connections for each is not saved. The last alternative selection rule is to select one based on a function of at least two factors such as preference, number of lost packets per unit time, number of connections, and estimated distance. For example, a weighted sum is computed for each mapped address and the one with the smallest sum is selected. As an example, if the weights for preference, number of lost packets, number of connections, and estimated distance are 50%, 20%, 20%, and 10%, respectively, and if one of the addresses in rows 320–322 in FIG. 3 is to be selected, the address in row 320 is selected because its weighted sum of 30.7 is smaller than that of 187.3 for the address in row 322. Note that the address in row 321 is not considered because it is in Down state.

Figure 4:
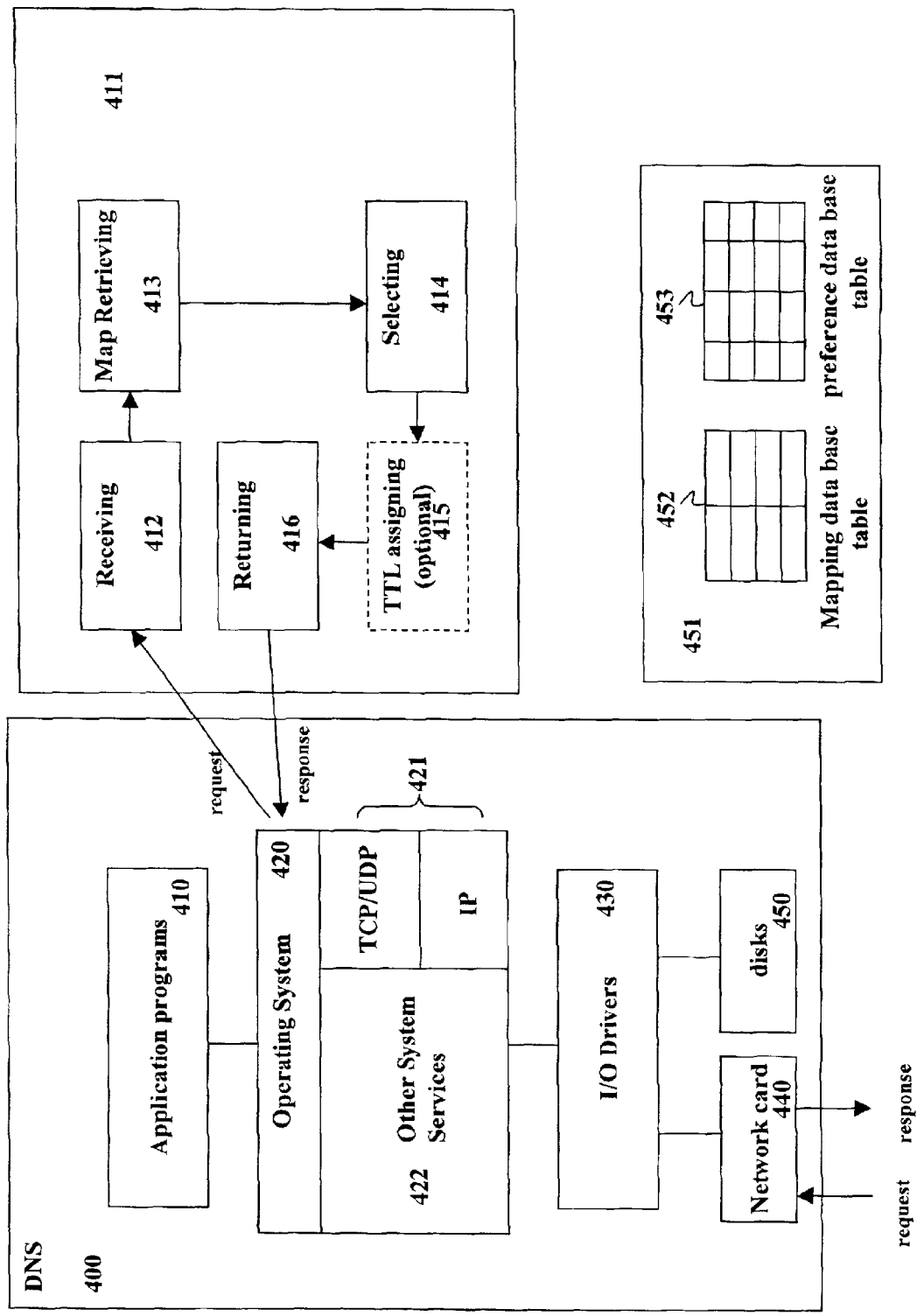
FIG. 4 shows an illustrative content provider DNS in accordance with the principles of the invention.

Referring to FIG. 4, an illustrative DNS in accordance with the principles of the invention is shown. DNS 400 comprises hardware (only disks and a network card are shown) and software. The hardware typically comprises a central processing unit (CPU) (not shown), main memory (not shown), secondary memory such as disks 450, and input/output (I/O) cards such as network card 440, as known in the art. For illustration purposes, the software comprises application programs 410, operating system 420, and I/O drivers 430. Operating system 420 comprises TCP/IP protocol suite 421 and other system services 422. Applications programs 410 generally invoke system services from operating system 420 to access I/O drivers 430 and the associated I/Os such as network card 440 and disks 450. Name server software 411, which is one of the application programs 410, maps an input name into an address as requested by a requester. Name server software 411 comprises receiving module 412, map retrieving module 413, selecting module 414, and returning module 416. Optionally, it also comprises TTL assigning module 415. Receiving module 412 invokes TCP/UDP services from operating system 420 to receive a request message for mapping an input name into an address. Receiving module 412 retrieves the input name and the requester identifier from the request message. As discussed previously, the domain of the requesting local DNS identifies the requester but if the request message contains the name or address of the requester, the name or address of the requester is used as the requester identifier. Map retrieving module 413 receives the input name from receiving module 412 and maps the input name against mapping database 452 to retrieve all addresses mapped to the input name. Mapping database resides in disk 451 which is part of disks 450. After receiving the requester identifier from receiving module 412 and all the retrieved mapped addresses from map retrieving module 413, selecting module 414 retrieves from preference database 453 a preference number associated with each retrieved mapped address and the requester identifier. Preference database 453 illustratively also resides in disk 451 and comprises a table such as shown in FIG. 3. Each entry of the preference table comprises an address such as the delivery server address in FIG. 3, a requester identifier such as the destination domain in FIG. 3, a preference number, and optionally a TTL value. Selecting module 414 selects an address based on the retrieved preference numbers, preferably, one with the highest preference number. Finally, returning module 416 returns a response comprising the selected address to the requester by invoking TCP/UDP services from operating system 420.

Optionally and in accordance with the principles of invention, TTL assigning module 415 dynamically assigns a TTL value to the selected address as a function of the associated preference number, and returning module 416 returns a response comprising both the selected address and the assigned TTL value. Preferably, the selected address is assigned the largest TTL value. It should be noted that name server software 411 may be initially recorded in a secondary memory such as a floppy disk (not shown), a tape (not shown), or a CD (not shown) before being loaded into the main memory (not shown) of DNS 400.

Figure 5B:
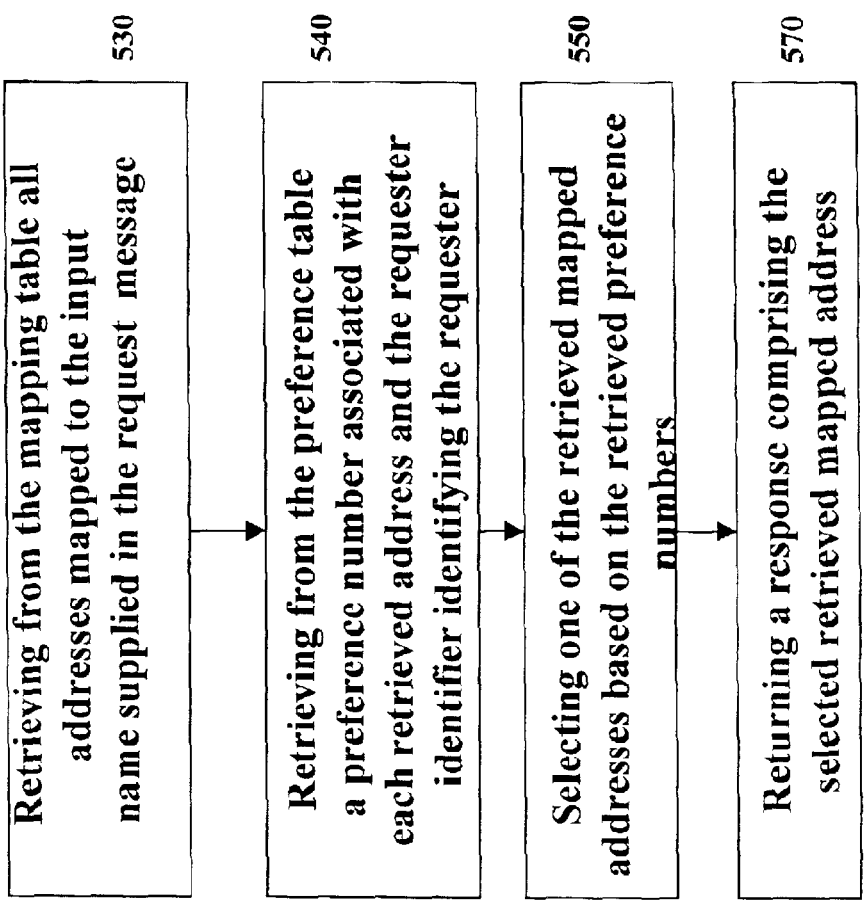
FIG. 5 shows an illustrative method for selecting one of the mapped addresses using the preference numbers in accordance with the principles of the invention.
Figure 5A:
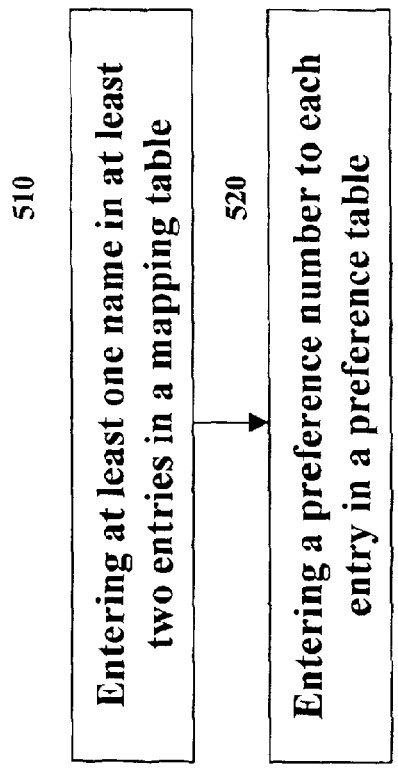

Referring now to FIG. 5*a* and FIG. 5*b* an illustrative method for selecting one of the mapped addresses by a content provider DNS is shown. At step 510 as shown in FIG. 5*a*, at least one name is entered in at least two entries in a mapping table. Step 510 is generally done once but it is incurred again if an update is needed. At step 520, a preference number is entered in each entry of a preference table such as shown in FIG. 3. Each entry of the preference table comprises an address, a requester identifier, and a preference number, wherein the requester is identified by a requester identifier and at least one requester identifier is listed in more than one entry. Step 520 is illustratively implemented manually but as mentioned previously, it can be done automatically. Step 520 is not incurred for every request. After the mapping table and the preference table have been populated in steps 510 and 520, the following four steps are taken for each received request. First, at step 530, the content provider DNS retrieves from the mapping table all addresses mapped to the input name. Second, at step 540, the content provider DNS retrieves from the preference table a preference number associated with each retrieved mapped address and the requester identifier identifying the requester. Third, the content provider DNS selects one of the retrieved mapped addresses based on the retrieved preference numbers. For example, the content provider DNS selects the retrieved mapped address with the highest preference number. Finally, at step 550, the content provider DNS returns a response comprising the selected retrieved mapped address.

Figure 6B:
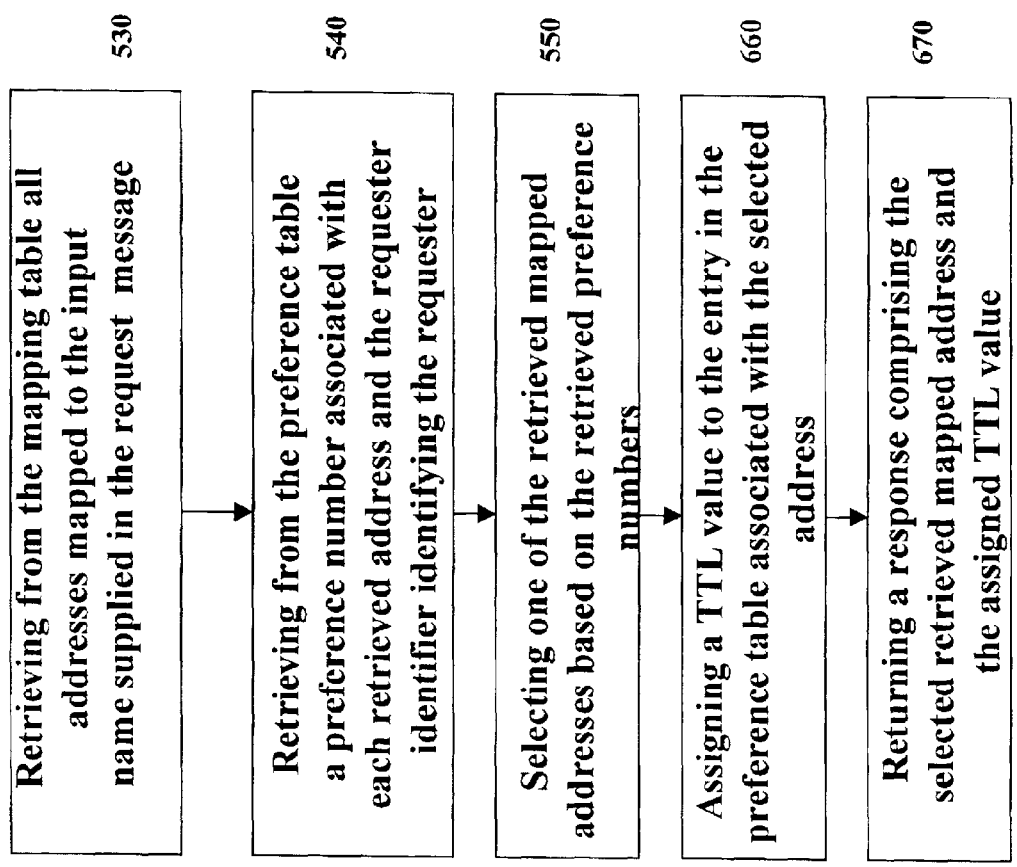
FIG. 6 shows an illustrative method for selecting one of the mapped addresses and assigning TTL values in accordance with the principles of the invention.
Figure 6A:
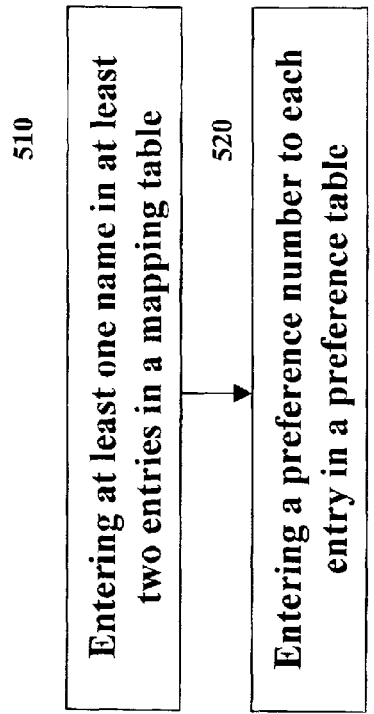

FIG. 6*a* and FIG 6*b* illustrates another selection method where a TTL value is dynamically assigned to the selected retrieved mapped address. The steps performing the same functions as those in FIG. 5 are labeled the same and are not described again. Step 660 is added to dynamically assign a TTL value to the entry in the preference table associated with the selected retrieved mapped address as a function of the preference number in that entry. Preferably, an assigned TTL value to an entry is directly related to the preference number in that entry, such that an entry with a higher preference number is assigned a larger TTL value. Using the preference table in FIG. 3 as an example, if the addresses in rows 320–322 are retrieved from the mapping table in step 530, address 154.192.16.15 in row 322 is selected because it has the highest retrieved preference number of 9 and, thus, is also assigned a largest TTL value of 9. Other entries associated with other retrieved mapped addresses and the requester identifier identifying the request can be updated as well. Although in the illustrative method, step 660 is performed every time an address is selected, the assignment can be done before or after an address has been selected. For example, the assignment can be done when a preference number has been updated. In that case, step 660 is changed to just retrieve the corresponding TTL value. Step 670 performs a similar function as step 570 except that the response also comprises the assigned TTL value.

A content delivery system other than those disclosed can be implemented using the teachings of the present invention. Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention.

What is claimed is:

1. A computer program product having a computer readable medium having computer program logic recorded thereon for mapping an input name into an address upon a request from a requester, the computer program product comprising:

(a) a receiving program code segment for causing a computer to receive the input name from the request;

(b) a mapping program code segment for causing the computer to map the input name against a mapping database for mapping a name to an address wherein at least one name is mapped to more than one address, the mapping program code segment also for causing the computer to retrieve from the mapping database all addresses mapped to the input name;

(c) a selecting program code segment for causing the computer to retrieve a preference number from a preference database associated with each retrieved mapped address and the input name, each entry of the preference database comprising an address, a requester identifier, and a preference number, wherein the requester is identified by the requester identifier and at least one requester identifier is listed in more than one entry, the selecting program code segment also for causing the computer to select one of the retrieved mapped addresses based on the retrieved preference numbers; and (d) a returning program code segment for causing the computer to return to the requester a response comprising the selected retrieved mapped address.

2. The computer program product of claim 1 wherein the selecting program code segment selects one of the retrieved mapped addresses having the highest retrieved preference number.

3. The computer program product of claim 1 further comprising an assigning program code segment for dynamically assigning a time-to-live (TTL) value to each entry in the preference database associated with the requester identifier.

4. The computer product of claim 1 further comprising an assigning program code segment for dynamically assigning a TTL value to the entry in the preference database associated with the selected retrieved mapped address.

5. The computer program product of claim 4 wherein the assigning program code segment dynamically assigns a TTL value to an entry in the preference database table as a function of the preference number in that entry.

6. The computer program product of claim 4 wherein the assigning program code segment assigns a TTL value to an entry in the preference database table directly related to the preference number of that entry.

7. A computer program product of claim 1 wherein a preference number associated with a retrieved mapped address is an estimated distance between the retrieved mapped address and the requester.

8. A method for mapping an input name into an address upon request from a requester, the method comprising the steps of:
   (a) retrieving from a mapping table all addresses mapped to the input name, each entry in the mapping table mapping a name to an address wherein at least one name is mapped to more than one address;
   (b) retrieving from a preference table a preference number associated with each retrieved mapped address and the input name, each entry of the preference table comprising an address, a requester identifier, and a preference number, wherein at least one requester identifier is listed in more than one entry;
   (c) selecting one of the retrieved mapped addresses based on the retrieved preference numbers; and
   (d) returning a response comprising the selected address.

9. The method of claim 8 wherein a retrieved mapped address with the highest retrieved preference number is selected.

10. The method of claim 8 wherein a preference number associated with a retrieved mapped address is an estimated distance between the retrieved mapped address and the requester.

11. The method of claim 8 further comprising the step of assigning a time-to-live (TTL) value to the entry in the preference table associated with each retrieved mapped address and the requester identifier.

12. The method of claim 8 further comprising the step of assigning a time-to-live (TTL) value to the entry in the preference table associated with the selected retrieved mapped address and the requester identifier.

13. The method of claim 12 wherein the response further comprising the assigned TTL value.

* * * * *